May 23, 1939.  W. MATTHEWS  2,159,034
BATTERY
Filed July 1, 1936
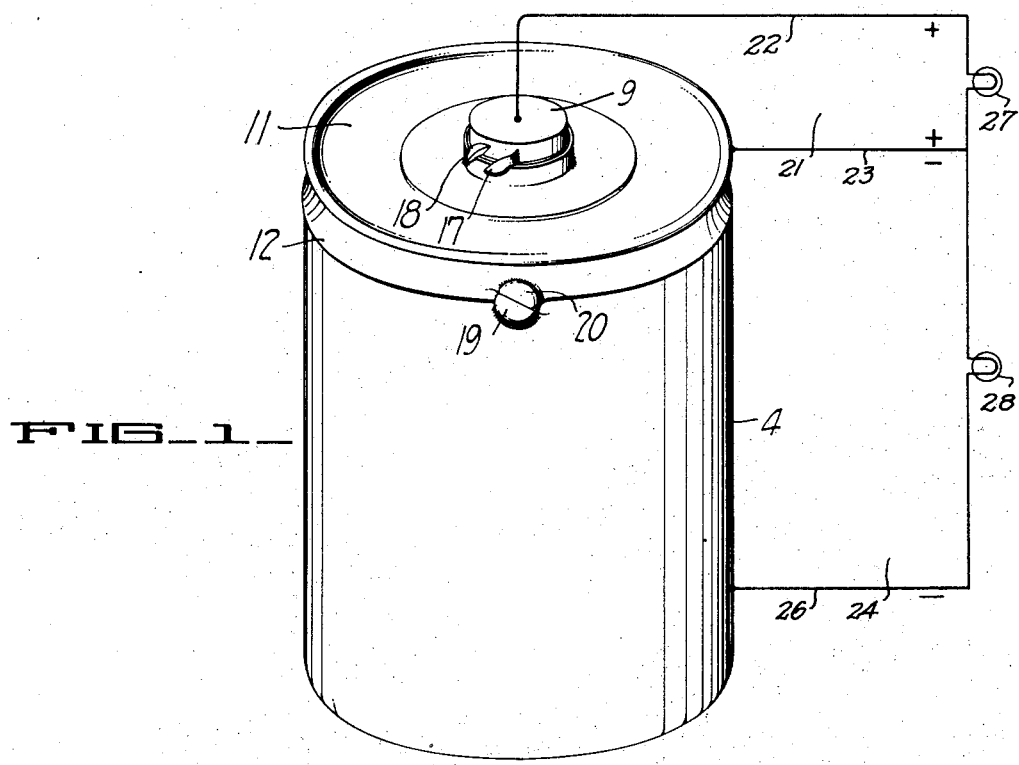
FIG_1_
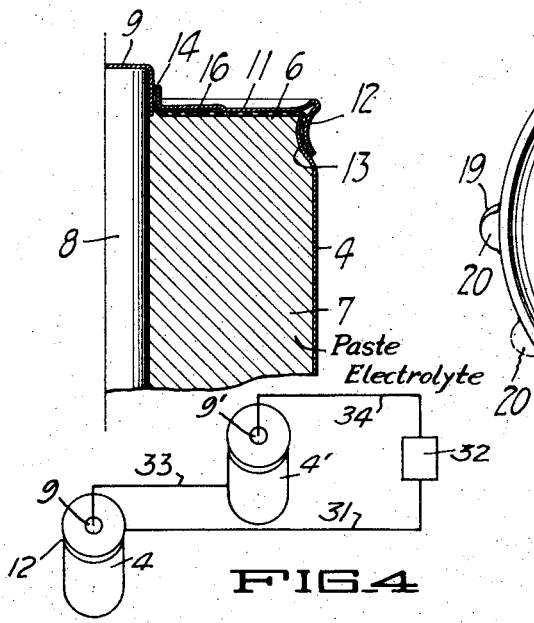
FIG_2_
Paste Electrolyte
FIG_4
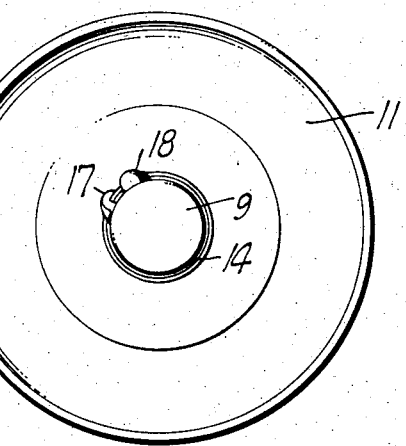
FIG_3_
INVENTOR.
Wayne Matthews
BY
ATTORNEY Patented May 23, 1939

2,159,034

UNITED STATES PATENT OFFICE 2,159,034

BATTERY

Wayne Matthews, Oakland, Calif.

Application July 1, 1936, Serial No. 88,421

5 Claims. (Cl. 136—83)

The invention relates to batteries and more particularly to that class of batteries known as "dry cells" and to the terminal construction thereof.

An object of the invention is to provide a battery of the character described which will be provided, in addition to the usual positive and negative terminals, with a third terminal of reversible polarity arranged for connection with said first and second terminals in a circuit to control the energization of certain branches of said circuit.

Another object of the invention is to provide a battery of the character described which will be simple and inexpensive in manufacture and which will have the several parts thereof so arranged to obtain positiveness in operation and a substantially unlimited period of life and usefulness.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a somewhat enlarged perspective view of the battery constructed in accordance with the present invention.

Figure 2 is a fragmentary cross-sectional view of the battery shown in Figure 1.

Figure 3 is an end view of the battery illustrated in Figure 1.

Figure 4 is a diagrammatic representation of a useful electric circuit in which the present battery may be employed.

With reference to the accompanying drawing, the battery or electric cell of the present invention comprises a metal anode casing 4, having an open end 6, and in which is carried and partially enclosed thereby an electrolyte 7 which is preferably in paste form and which is disposed between the anode and the cathode. Mounted in the electrolyte and centrally extending from the end 6 of the casing is an electro-positive electrode 8 usually known as the cathode about the outer end of which is mounted a metallic sleeve or terminal 9. As will be understood, and in accordance with the usual battery construction there is established between the electrode 8 and the casing 4 a difference of potential and these members serve as positive and negative terminals respectively of the battery.

In the present battery there is provided, in addition to the positive and negative terminals 8 and 4 a third terminal which, while normally neutral and not connected to either terminals 8 or 4, may be selectively connected to either of these terminals to energize such third terminal at either a positive or negative potential, whereby the current in any one particular circuit may be controlled, or the battery may be connected in a circuit arrangement wherein the neutral or energized character of the third terminal and the polarity of said third terminal when energized, will control the current flow in certain branches of such circuit. In accordance with the present construction, this third terminal is provided by a cap or end 11 which is rotatably secured at its outer periphery to the open end 6 of the casing 4 as by means of internested annular channel portions 12 and 13 on the cap and casing, and is formed with a central opening 14 surrounding the sleeve or terminal 9 of the electrode 8. Normally the cap is maintained at a neutral polarity unconnected with the potential of the battery. To effect this isolation of the cap from the battery terminals, I may use a sheet of paper or other insulation material 16, which is positioned between the terminal 9 and the adjacent edges of the cap forming the opening 14, between the under side of the cap and the electrolyte 7 and between the engaged portions 12 and 13 of the cap and casing whereby the cap is completely insulated from the terminals and the electrolyte of the battery. Preferably, the portions 12 and 13 of the cap and casing and also the adjacent edges of the cap and the terminal 9 are relatively loosely connected so as to reduce to a minimum any wear on the insulation member 16.

It will be observed that the cover member 11 forms a completion of the enclosure of the electrolyte 7, the latter being only partially enclosed by the casing 4.

Means for energizing the cap and enabling a reversal in polarity thereof is effected by permitting a selective electrical connection of the cap to the terminals 8 and 4 of the battery and comprises a pair of switch contacts 17 and 18 mounted on the cap 11 and terminal 9 respectively, and which in one circumferential position of the cap relative to the casing 4 and terminal 9, will engage to energize the cap at a positive polarity. Similarly, a pair of switch contacts 19 and 20 are secured to the casing 4 and the periphery of the cap 11 and are caused to engage at a different circumferential position of the cap relative to the casing and the positive terminal to energize the cap at a negative potential. In practice, I have found that the contacts 17, 18 and 19 and 20 may be simply formed by placing a drop of solder or the like, at the line of separation of the cap and the terminal 11 and the casing 4 and sawing or otherwise forming a slit in the solder to release the cap from the terminal 9 and the casing 4 for rotation. Preferably, the slitted portion is formed at a small incline to the plane of rotation of the cap whereby the contacting faces of the switch contacts will be moved into a firmly wedged engagement thereby insuring a good electrical contact, and in addition, the contacts will serve as a stop to the circumferential displacement of the cap. It will now be clear, and as is perhaps best illustrated in Figure 3, a rotation of the cap relative to the casing 4 and the terminal 9 in a clockwise direction will engage the switch contacts 19 and 20 and cause the cap to assume a negative potential, whereas a relative rotation of the cap from this position in a counter-clockwise direction will disengage the contacts 19 and 20 and at a spaced circumferential position cause the engagement of the contacts 17 and 18 and the positive energization of the cap; and it will be further clearly understood, that in this manner the cap may be changed from a neutral to either a positive or negative potential with corresponding changes in the energization of external circuits connected thereto.

A simple external hook up has been shown in Figure 1 for illustrating a use of the selective energization of the cap 12 wherein one circuit 21 is connected by conductors 22 and 23 to the positive terminal 9 and the cap 12 respectively and a second circuit 24 is connected by conductors 23 and conductor 26 to the cap 12 and negative case 4 respectively. Loads 27 and 28 are shown in circuits 21 and 24 for purpose of illustration and as will be noted these loads are connected in series across conductors 22 and 26. It will be clear from this hook up that upon rotation of the cap 12 to engage contacts 17 and 18 and to thereby make the cap electro-positive, current will flow through circuit 24 only and the load 28 will be energized. Upon rotation of the cap to a neutral position, that is with both sets of contact 17, 18 and 19, 20 open, current will flow through both circuits by way of conductors 22 and 26 and both of the loads 27 and 28 will be energized in series. When the cap is rotated to engage contacts 19 and 20 as illustrated in Figure 1, and the cap thereby rendered electro-negative, current will flow through the circuit 21 only and the load 27 will energized. Thus in the setup illustrated, operation of the cap may effect the energization of both or either of the two external circuits.

Another use of the present battery is in series circuits wherein a plurality of batteries are connected in series to provide an additive voltage and wherein it is desired to control such voltage by taking one or more of the batteries out of operation. Such an arrangement is useful, for example, in hearing kits where a control of the volume of operation of the hearing means is desired. Such an electric connection between a plurality of the present batteries has been illustrated in Figure 4, wherein the batteries are connected in series, with the connection to one of the batteries being made to the cap 12. In the illustration of Figure 4, the cap 12 of one battery 4 is connected by way of conductor 31 to one side of an electric circuit including a load 32, and the positive terminal 9 of the battery is connected by way of conductor 33 to the negative casing 4' of a second battery. The positive terminal 9' of the second battery is connected by way of conductor 34 to the opposite side of the load 32 in order to complete the electric circuit. It will be seen that with the cap 12 turned to a negative potential, the voltage of the two batteries will be additive in the circuit. With the cap 12 turned to a neutral position, the circuit is open. With the cap 12 turned to a positive position, the electric circuit is made directly through the cap 12 leaving the first battery out of the circuit and thereby reducing the voltage to that provided by the second battery. The second battery may consist of an ordinary dry cell if desired.

The battery will have a large number of uses and applications, as will be apparent to those skilled in the art.

I claim:

1. An open ended metal casing, a positive element centrally disposed therein and extended from said end, an electrolyte in said casing, a metal cap rotatably carried by said casing and positive electrode, insulation means between said cap and said element and between said cap and said casing, and switch contacts connected to said cap and said element and casing and engageable in the different circumferential positions of said cap to selectively electrically connect said cap to said element and to said casing.

2. A battery comprising, a metallic casing having an open end, an electrolyte in said casing, an electro-positive member mounted in said electrolyte and extended centrally from the open end of said casing, a cap of electric conducting material rotatably mounted on said end and about said member and being insulated therefrom, and wedge shaped electric contact members secured to said cap and member and casing and operative to electrically connect said cap selectively to said member and said casing in different circumferential positions of said cap relative to said casing.

3. A battery comprising, a metallic casing having an open end, an electrolyte in said casing, an electro-positive member mounted in said electrolyte and extended centrally from the open end of said casing, a metal sleeve embracing said member, a metal cap rotatably mounted on said end and having a central opening surrounding said sleeve, a sheet of material electrically insulating said cap from said casing and electrolyte and sleeve, switch contacts on said casing and sleeve, and switch contacts on said cap adapted in one circumferential position on said cap to engage the contact of said sleeve to connect said cap with the positive electrode of said battery and in another circumferential position of said cap to engage the contact on said casing to connect said cap with the negative electrode of said battery.

4. A battery comprising, a negative casing provided with a substantially circular end, a positive element extending longitudinally through said casing and positioned substantially at the center of said end and substantially in the plane of said end, a metal cap rotatably mounted on said casing and surrounding said element and being insulated from said element and casing, and switch contacts connected to said cap and said element and said casing and engageable in different circumferential positions of said cap to selectively electrically connect said cap to said element and said casing.

5. An electric cell and switch comprising; a casing anode having a contact, and a cathode having a contact; a switch and cover member rotatably journalled on said anode and said cathode, said member carrying switch contacts, whereby said member forms a closure for said casing and a switch arm to contact said anode and cathode contacts, and means insulating said switch and cover member from said anode and cathode except for coaction of said contacts.

WAYNE MATTHEWS.